June 23, 1970  H. B. CARR  3,516,550
ROTARY DRUM STRAINER

Filed Jan. 22, 1969  3 Sheets-Sheet 1

Inventor
Hugh B. Carr.
By
Parmelee, Utzler & Welsh
Attorneys.

June 23, 1970

H. B. CARR 3,516,550

ROTARY DRUM STRAINER

Filed Jan. 22, 1969

INVENTOR.
*Hugh B. Carr.*

BY
*Parmelee, Utzler & Welsh.*

Attorneys.

United States Patent Office 3,516,550
Patented June 23, 1970

3,516,550
ROTARY DRUM STRAINER
Hugh B. Carr, McMurray, Pa., assignor to S. P. Kinney Engineers, Inc., Carnegie, Pa., a corporation of Pennsylvania
Filed Jan. 22, 1969, Ser. No. 793,102
Int. Cl. B01d 33/06
U.S. Cl. 210—359                                    4 Claims

ABSTRACT OF THE DISCLOSURE

There is disclosed a rotary drum type of strainer, in one form of which the strained water is discharged from the end of the strainer casing, and in a second form where it flows out the end of the casing into an annular chamber which has an outlet connection through the side wall. Either provides for pipe connections to be provided to direct the outflow in any selected direction.

---

This invention is for a strainer of the rotating drum type in which the drum, with straining media in the side walls, is rotatable relatively to a backwash shoe through which substances removed from the water or other liquid being strained is flushed at one position around the periphery of the drum by reverse flow into a backwash shoe. Particularly the invention is for an improvement in a rotary drum strainer as disclosed in U.S. Pat. No. 3,327,861, granted June 27, 1967.

Rotary drum strainers as disclosed in said patent comprise a generally cylindrical casing having a strainer drum in the form of a truncated cone therein, and the strainer media are received in holes in the side wall of this drum. Water or other liquid to be strained enters through a pipe connected to a flanged inlet on the casing near the lower end, rises around the drum, and the water or liquid passes through the straining media in the drum. Around the open bottom of the drum there is an annular sealing and bearing ring carried on an enclosure built into the lower part of the casing, and the strained water flows into this enclosure and out a flanged outlet part diametrically opposite the inlet.

This is a desirable structure where the inlet and outlet pipes are in a straight line, but involves one or more right-angle pipe bends where the outlet pipe must be at right angles to the inlet, or must extend away from the strainer at the same side as the inlet. Each pipe bend not only adds cost to an installation, but adds to the pressure drop against which a pump to induce the flow of liquid through the strainer must work. In addition, the liquid in such a strainer must always change its direction of flow through four 90° bends, irrespective of the direction of the offtake pipe relative to the inlet; that is, it flows into the bottom of the strainer and is deflected vertically upward around the drum, then flows horizontally through the drum, and vertically downward through the open bottom of the drum, and finally horizontally through the enclosure below the drum to the outlet, a total of 360°.

One of the novel features of said patent is that with the special bearing construction therein shown and the hub arrangement at the top of the drum, it was not longer necessary to have vertical shaft extending down through the drum and through the bottom of the casing into an external adjustable thrust bearing outside the bottom of the casing, as had theretofore been necessary.

I have now discovered that with the elimination of this through shaft the strainer of said Pat. No. 3,327,861 can be readily accommodated to give new flexibility to the piping arrangement with little additional material or fabricating cost, and reduce the internal pressure drop through the strainer.

This is accomplished first by having the inlet and outlet pipe connections at different levels and omitting the usual enclosure separating the outlet water from the inlet water that has heretofore been required.

The invention may be more fully understood by reference to the accompanying drawing in which.

Figure 1:
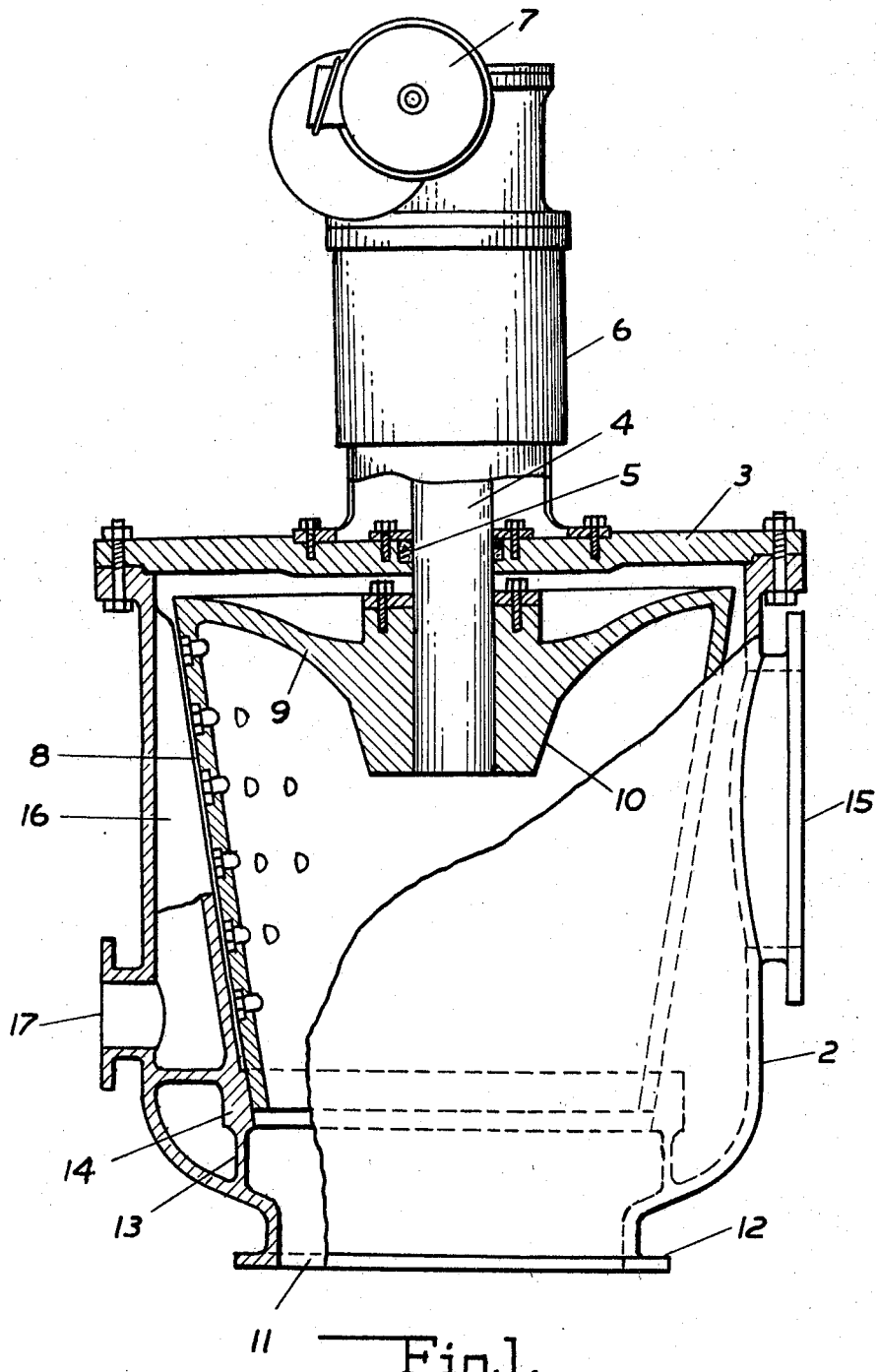
FIG. 1 is a vertical section through the strainer with a bottom outlet.

In the drawing, with particular reference to FIG. 1, the numeral 2 designates a generally cylindrical casing. It has a removable top cover 3 bolted thereto, and there is a central shaft 4 passing through a gland 5 in the cover and extending upwardly into a housing 6 which contains spaced upper and lower bearings (not shown), that serve both as radial bearings and thrust bearings, as shown in Pat. No. 3,327,861, the disclosure of which is incorporated herein by reference. At the top of this housing is a drive motor and gear 7.

There is an inverted truncated cone-shaped strainer drum 8 having a top portion 9 with a central hub 10 that is fixed onto the lower end of the shaft 4 so that the drum is suspended from the shaft, as more fully described in said patent. There are holes in the side wall of the drum into each of which a strainer element is removably fixed, as is well understood in the art. The bottom of the drum is open and there is an opening 11 in the bottom of the casing of approximately the same diameter. Around the open bottom end of the casing there is a flange 12 to which an outlet connection (not shown) is bolted.

The casing has a completely annular concentric internal partition wall 13 at the top of which is a sealing ring 14 into with the lower end of the drum fits with sufficient freedom for the drum to rotate, but with insufficient clearance to permit passage of solids larger than can pass through the straining media. The inlet to the strainer is provided by a flanged inlet connection 15 on the side of the drum entirely above the ring 14 and below the top of the drum. The casing extends below the internal wall 12 and has an unobstructed internal diameter below the partition wall larger than the open end of the drum.

The backwash shoe 16 is provided in the casing to bear against the exterior of the drum, as is well understood in the art, and 17 indicates the flanged outlet from the backwash shoe.

With the strainer so constructed, water or other liquid containing solids enters the side of the casing at the level of the drum. Its direction of flow is horizontally through the strainer media and axially out the end of the drum and casing, making a single 90° general change of direction through the strainer. The casing may be set so that the inlet is turned in any direction for connection to the water supply pipe, and while the strainer has herein been referred to as an upright structure, it may be positioned on its side, where the outlet is horizontal and the inlet may be from either side or the top or bottom. Likewise it may be set in an inclined position.

In addition, a flanged elbow may be bolted to the flange 12 to direct the outlet water in any radial direction desired. Such an elbow (not shown) can be bolted onto the flange to discharge in any direction around a complete circle. This versatility is secured without changing the casing construction in any way for all different arrangements, and is made possible by the fact that the shaft for the drum requires no bearing at the bottom of the casing so that the bottom of the casing is open and provides the outlet connection. With an elbow such as described, the water makes only two 90° turns between the inlet and the discharge from the elbow.

Figure 2:
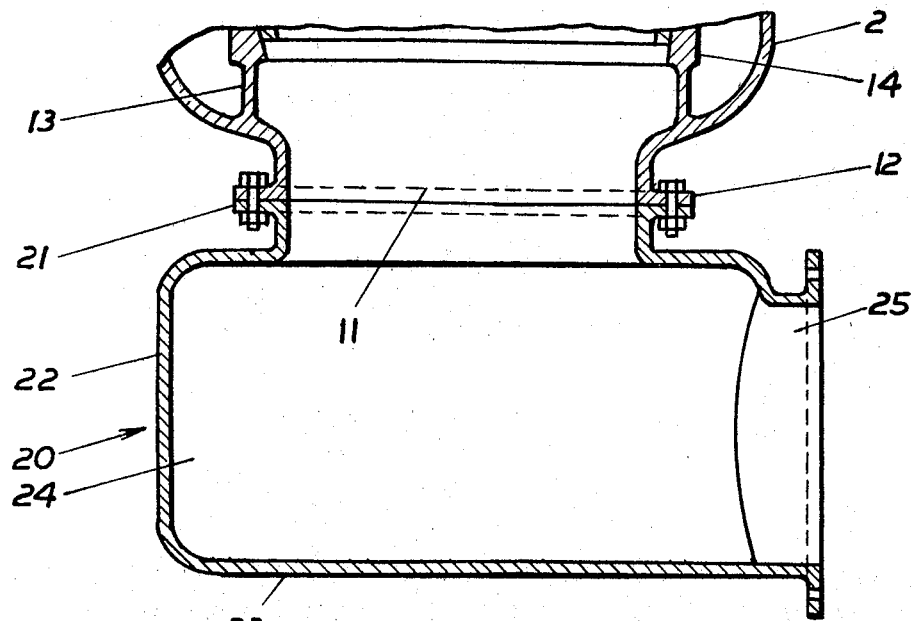
FIG. 2 is similar to the lower part of FIG. 1, but shows a part added thereto to enable a radial outlet to be located at almost any angle in a 360° range.

Since industrial strainers of this type often require large diameter pipes, sometimes up to 48 inches in diameter, there may not be vertical clearance to accommodate the strainer and the pipe bend elbow, and for that reason, as well as for reasons of economy, the structure shown in FIG. 2 may be provided.

In FIG. 2 the strainer per se is the same as that shown in FIG. 1, and corresponding reference numerals have been used to designate the corresponding parts. In this figure an extension unit 20 is bolted onto the flange 14. It has a top portion 21 that is flanged for connection to the axial outlet of the strainer, and it has a circular side wall 22 and a closed bottom 23 forming an unobstructed chamber or enclosure 24. In horizontal section it is substantially the same as FIG. 4. There is an outlet connection 25 in the side wall, and this unit can be bolted onto the flange 14 so as to face the outlet in any direction, or more than one outlet may be provided should there be any situation requiring that the outlet flow be divided.

The arrangement shown in FIG. 2 provides a substitute for an elbow connection at the discharge where the flow must be diverted from an axial to a radial direction, but without increasing the overall height of the strainer as much as would an elbow. Also it permits the user to shift piping arrangements as changes in the water cleaning system of the plant in which it is used may require.

Figure 4:
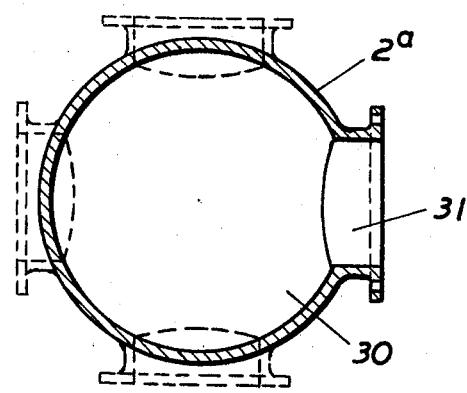
FIG. 4 is a horizontal section in the plane of line IV—IV of FIG. 3, but on a smaller scale.
Figure 3:
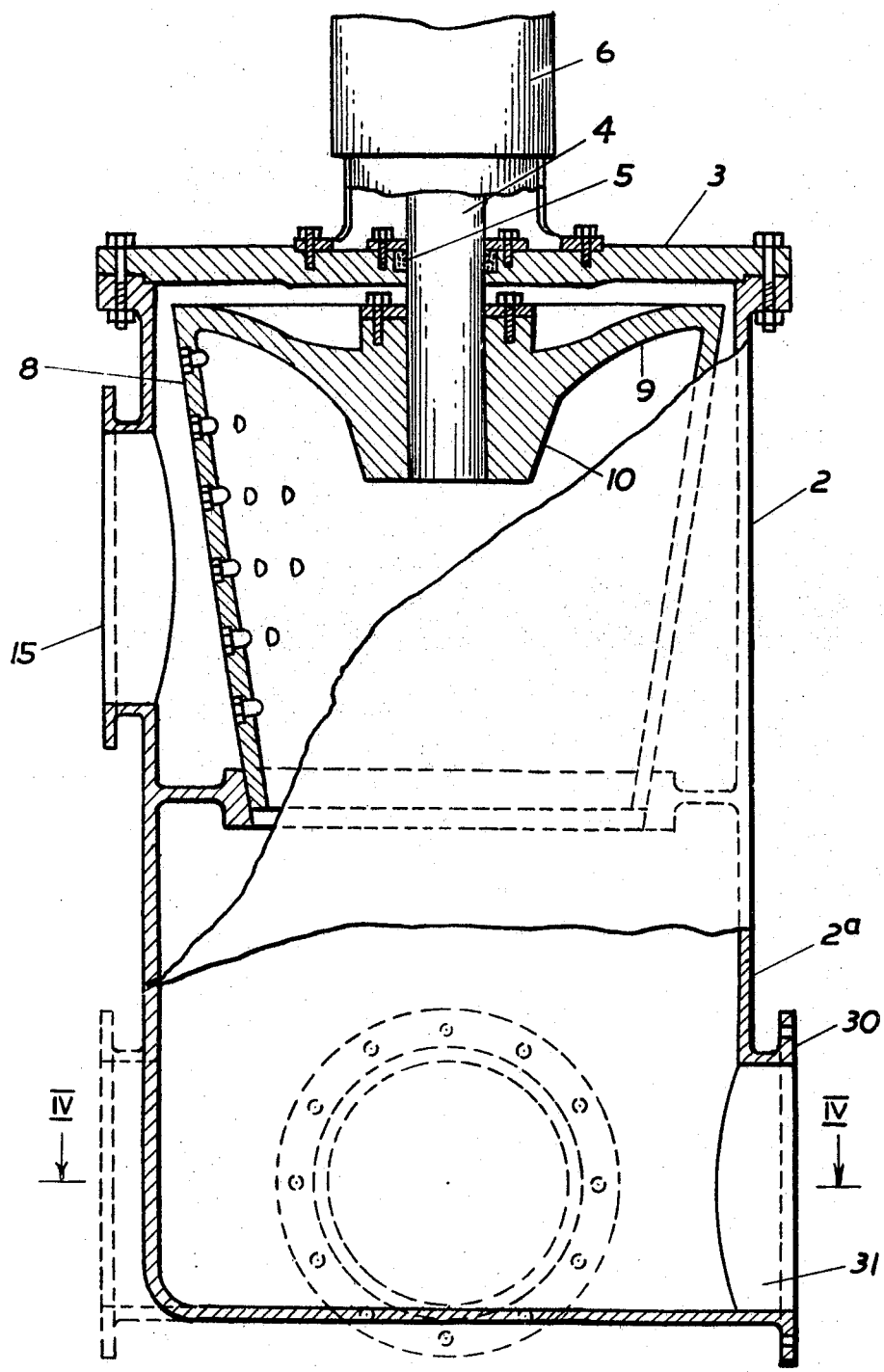
FIG. 3 is a view similar to FIG. 2, but wherein the casing is integral instead of being formed in two parts, as in FIG. 2.

In the modification shown in FIGS. 3 and 4, the added section provided in FIG. 2 is made as an integral part of the strainer casing and the structure is cheaper to manufacture than the two-part construction of FIG. 2. However, as in FIG. 2, it provides a chamber for receiving the strained water from the axial discharge from the drum, and it enables the outlet connection to be at any location 360° around the casing. This apparatus can be used in place of the arrangement shown in FIG. 2 where the customer can specify in advance where he wants the outlet with respect to the inlet.

In this figure, as in FIG. 1, the casing, drum, drive shaft and seal at the bottom of the drum are essentially the same as in FIG. 1, but in this construction the casing extends downwardly to form a cylindrical enclosure, the upper part of the casing being here designated 2, and the extending portion 2a. It provides a chamber or enclosure 30 which, like the chamber 24 in FIG. 2, is continuously open and unobstructed. The open lower end of the drum discharges vertically downward into this chamber. There is an outlet connection 31 on the side of this extension, and as shown in dotted lines in FIG. 4, this outlet may be placed to discharge in various directions. If, as is normally the practice, the casing is fabricated by welding together various preformed parts, the discharge outlet is provided at the required location by simply cutting an opening in the side wall and welding in the flanged connector. The backwash shoe does not show in this figure, but is the same as previously described.

In all of the structures here described, the strained water is discharged axially from the drum and there is no lower shaft bearing to be considered. In all forms the drum extends into a sealing ring which is inside the casing carried on a completely annular concentric supporting wall that separates the space above the partition from the space below it. In all forms the casing has an extension below the partition forming an unobstructed circular passage which is of larger internal diameter at the open bottom of the drum. Also, in FIGS. 2 and 3 the water discharges into an unobstructed cylindrical chamber and the lower portion of the casing does not require an enclosed outlet passage partitioned off from the inlet passage at the same level, as in Pat. No. 3,327,861. While there are requirements where in-line inlet and outlet connections are desirable, the present invention adapts itself to the many situations where in-line connections are not wanted and are even of a disadvantage. In all three embodiments in this application, the water flow makes no more than two 90° general turns of direction, as compared to four disclosed in my said earlier patent, with the result that there is a substantial reduction in the pressure drop between the inlet and outlet in the present arrangement.

In all forms of the invention here disclosed, the water flows from the bottom of the drum directly into a continuously circular outlet provided in FIG. 1 by the annular wall 13, and in FIG. 2 by the same annular wall and the attachement 20, and in FIG. 3 by the casing extension 2a.

In both FIGS. 2 and 3 the continuously circular outlet is provided by the attachment or the extended portion of the casing, respectively, and is of larger diameter than the diameter of the open end of the drum.

It may be pointed out also that with the present invention the inlet opening may be positioned anywhere around the drum that the user may require, except that the location of the backwash shoe precludes its being positioned in the area of the backwash. With the inlet and outlet at the same level, as disclosed in said earlier patent, this is not feasible.

I claim:

1. A rotary drum strainer of the type having a cylindrical casing with a closed top and a strainer drum rotatably suspended inside the casing entirely from a shaft on the top of the drum, which shaft extends upwardly through the top of the casing and with the bottom of the drum being rotatably fitted into an annular sealing ring, there being a space around the drum above the sealing ring and below the top of the casing for the circulation of liquid about the drum, wherein:
   (a) the casing has a water inlet connection opening into said space on the side wall thereof above said sealing ring and below the top of the casing,
   (b) a completely annular supporting wall concentrically located inside the casing and integral therewith on which the sealing ring is carried,
   (c) the casing having an annular exterior wall portion extending downwardly from said supporting wall providing an unobstructed passageway therein having an internal diameter larger than the open bottom end of the drum and providing an axially-extending outlet passage below the sealing ring and its supporting wall, and
   (d) an outlet connection on said annular extension entirely below the level of the sealing ring, said supporting wall separating the space above it from the space within the passageway below it.

2. A strainer as defined in claim 1 wherein said annular supporting wall extends axially down from the sealing ring and is integrated with said annular downwardly-extending wall portion at a level below the sealing ring, said annular extended wall portion being open at its bottom with the outlet connection being provided by a coupling flange about said open end.

3. A strainer as defined in claim 1 wherein said downwardly-extending wall portion is larger in diameter than the diameter of the sealing ring and the outlet connection projects from the side of said downwardly-extending portion.

4. A rotary drum strainer as defined in claim 3 wherein the lowermost part of said downwardly-extending portion of the casing comprises a separate member detachably connected to the body of the casing above it, said lowermost part having a side wall and a closed bottom, the outlet connection being on the side wall of said separate member.

References Cited

UNITED STATES PATENTS

| | | | |
|---|---|---|---|
| 1,968,741 | 7/1934 | Burrell | 210—392 |
| 2,015,467 | 9/1935 | Beldam | 210—393 X |
| 3,327,861 | 6/1967 | Carr | 210—392 |

J. L. DE CESARE, Primary Examiner

U.S. Cl. X.R.

210—392, 398